(No Model.)
J. CAMPBELL.
COVERING WHEEL FOR DRILLS, &c.
No. 447,938. Patented Mar. 10, 1891.
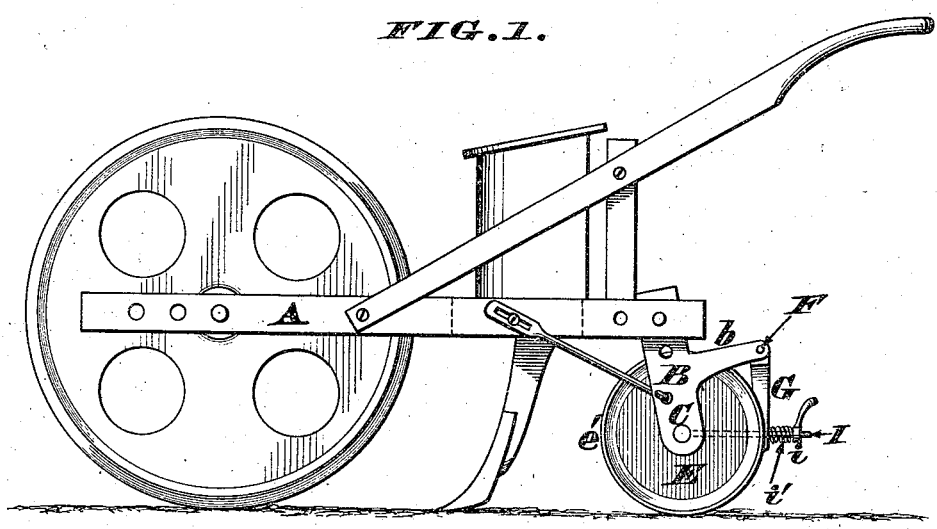
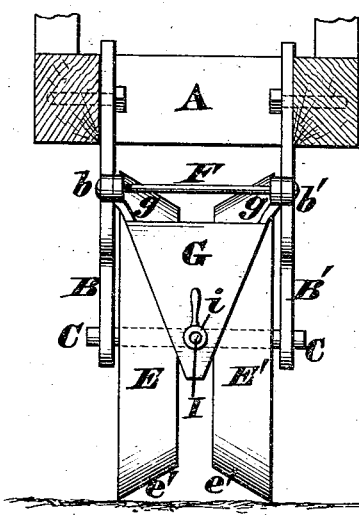
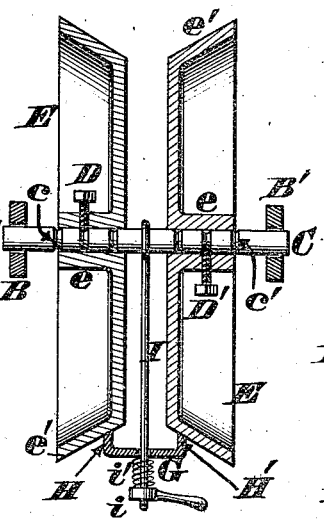
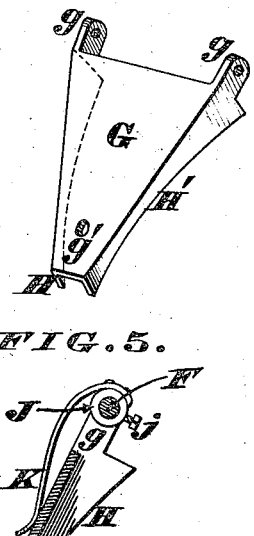
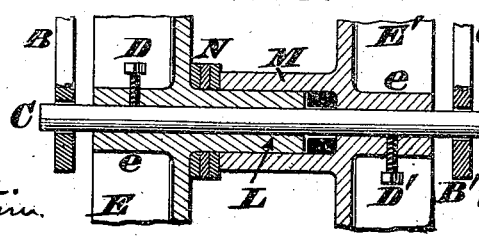
Attest:
James Moore.
Samuel M. Quinn.
Inventor:
James Campbell.
by James F. Layman
Atty.

United States Patent Office.

JAMES CAMPBELL, OF HARRISON, OHIO.

COVERING-WHEEL FOR DRILLS, &c.

SPECIFICATION forming part of Letters Patent No. 447,938, dated March 10, 1891.

Application filed October 27, 1890. Serial No. 369,386. (No model.)

*To all whom it may concern:*

Be it known that I, JAMES CAMPBELL, a citizen of the United States, residing at Harrison, in the county of Hamilton and State of Ohio, have invented certain new and useful Improvements in Covering-Wheels for Drills, Planters, &c.; and I do hereby declare the following to be a full, clear, and exact description of the invention, reference being had to the annexed drawings, which form part of this specification.

The first part of my present improvements comprises a novel construction of covering-wheel to be attached to the rear end of drills, planters, and other similar agricultural implements, the details of said wheel being hereinafter more fully described, and then pointed out in the claims.

The second part of my improvements comprises a self-adjusting scraper that can be held against the periphery of a covering-wheel with any desired pressure, as hereinafter more fully described, and then pointed out in the claims.

In the annexed drawings, Figure 1 is a side elevation of a corn-seed drill provided with the preferred construction of my covering wheel and scraper. Fig. 2 is an enlarged elevation of the rear portion of said implement. Fig. 3 is an enlarged horizontal section of the covering-wheel of the same. Fig. 4 is a perspective view of the scraper detached from the implement. Fig. 5 is a vertical section of a modification of said scraper. Fig. 6 is a section through the central portion of a modified form of the covering-wheel.

Referring to Figs. 1 and 2, A represents the main frame of a grain drill or planter or other similar agricultural implement to which a covering-wheel can be advantageously applied, and B B' are vertically-adjustable hangers secured to the rear end of this frame.

C is a horizontal shaft journaled in these hangers and provided with a series of circumferential grooves c c', shown in Fig. 3, which grooves receive the points of screws D D', tapped in the hubs e e, of disks or wheels E E', the latter being furnished with inwardly-sloping rims or treads e' e'. Projecting rearwardly from the hangers B B' are extensions b b', supporting a rod F, from which depends a scraper consisting of an approximately triangular-shaped plate G, having side flanges H H', whose front edges are concaved, as seen in Fig. 4, to afford a snug fit against the peripheries of the wheels E E'. The upper end of plate G has perforated ears g g, wherewith it is suspended, while a hole g', near the lower end of said plate, is traversed by the threaded portion of a rod I, whose front end is coupled to the shaft C.

i is a nut engaged with the rear or screw-threaded end of this rod, and i' is a spring interposed between said nut and the scraper G, by which arrangement of devices said scraper can be held against the peripheries of the covering wheels or disks with a graduated but yielding pressure.

From the above description it is apparent that by simply unslackening the screws D D' until their points are clear of the grooves c c' the wheels or disks E E' may be adjusted either toward or away from each other, and after the proper change has been effected said wheels are again secured in place by re-engaging said screws with the appropriate grooves. This ready but perfectly-secure adjustment of the covering-wheels enables them to be set according to any peculiar construction of the implement or the special requirement of the grain dropped therefrom. It is also apparent that by simply turning the nut i a greater or less tension will be imparted to the spring i', thereby graduating the pressure of the scraper, and after the side flanges of the latter have been worn completely down the plate G will still be serviceable.

In the modification of the scraper seen in Fig. 5 the rod F has a collar J secured to it by means of a set-screw j, and said collar has one end of a spring K attached to it, the free end of this spring being in contact with plate G. By turning the collar J around on the shaft F the pressure of spring K can be regulated to suit the requirements of the implement.

In the modification of the covering-wheel seen in Fig. 6 the hub e of wheel E is prolonged inwardly to form a sleeve L, that traverses a tubular extension M of the hub e of the other wheel E'. N are washers interposed between the end of tube M and inner face of wheel E after the desired adjustment has been made.

Finally, either form of my covering wheels or disks may be rigidly secured to the shaft or they may be made to revolve around the latter.

I claim as my invention—

1. The combination, in a drill or planter or other similar implement, of the swinging scraper G, rod I, nut $i$, and spring $i'$, the front end of said rod being coupled to the shaft of the covering wheels or disks, for the purpose described.

2. The scraper G, having side flanges H H', which flanges have concave front edges, for the purpose described.

3. The combination, in an agricultural implement, of main frame A, hangers B $b$ B' $b'$, shaft C, wheels or disks E E', adjustably secured along said shaft, rod F, scraper G, freely suspended from said rod, and rod I, coupled to said shaft C and having at its rear end a nut $i$ and spring $i'$, all as herein described, and for the purpose stated.

In testimony whereof I affix my signature in presence of two witnesses.

JAMES CAMPBELL.

Witnesses:
 JAMES H. LAYMAN,
 SAMUEL M. QUINN.